Patented Jan. 7, 1941

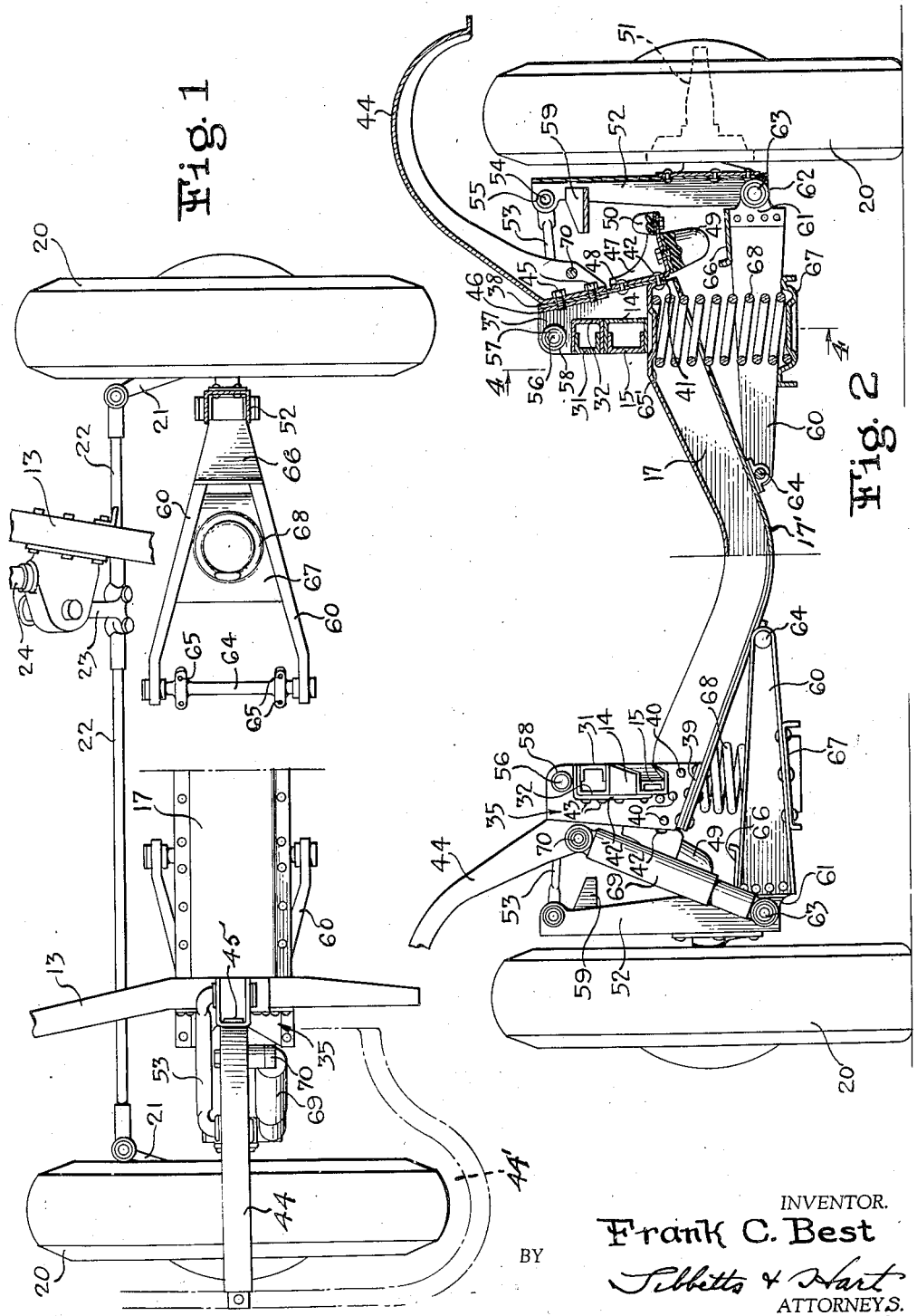

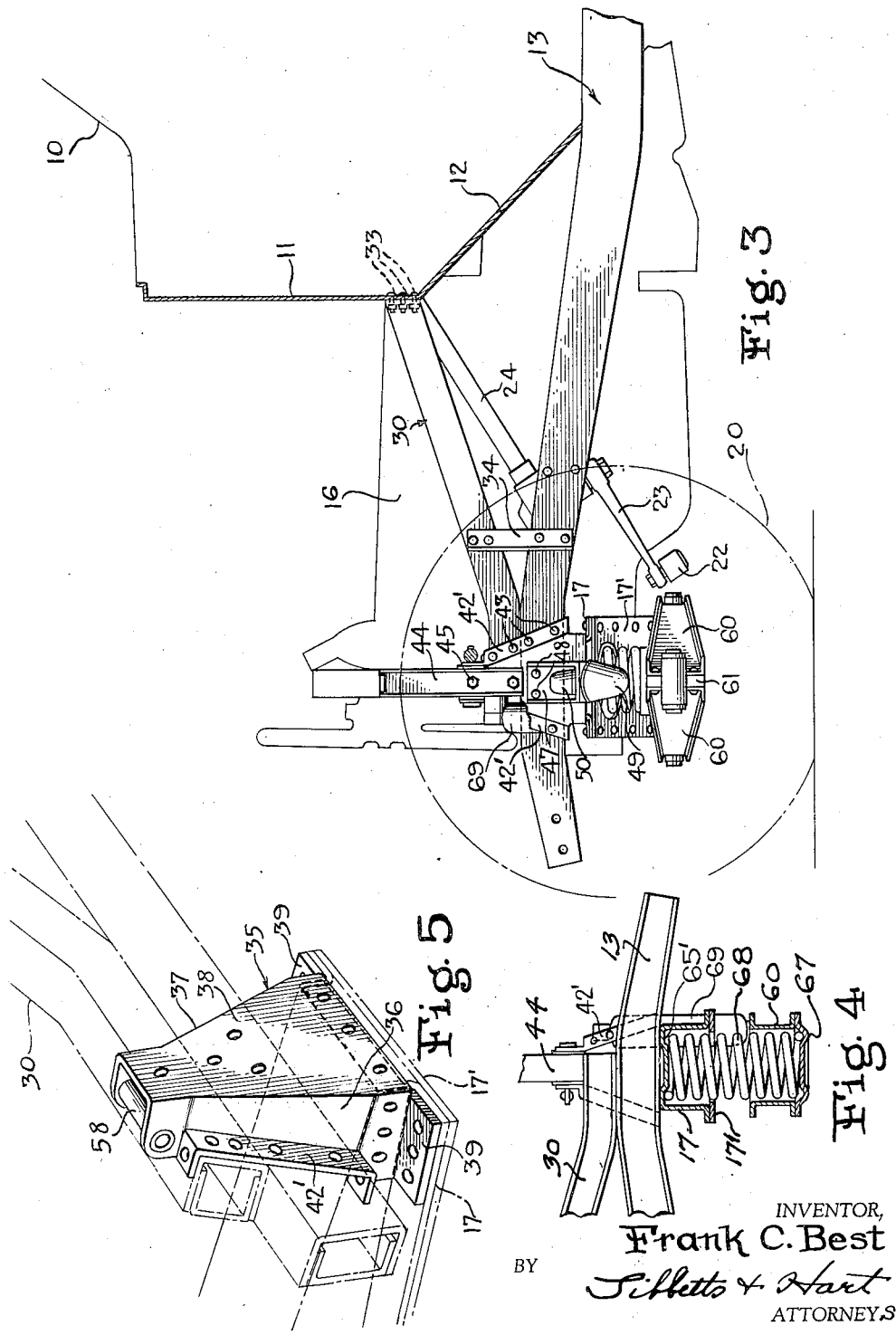

2,228,107

UNITED STATES PATENT OFFICE 2,228,107

MOTOR VEHICLE

Frank C. Best, Detroit, Mich., assignor to Packard Motor Car Company, Detroit, Mich., a corporation of Michigan Application September 12, 1938, Serial No. 229,421

10 Claims. (Cl. 280—106)

This invention relates to motor vehicles and more particularly to motor vehicle chassis front end constructions.

An object of the invention is to provide a front end construction for a motor vehicle chassis that is extremely light and sufficiently strong.

A further object of the invention resides in a vehicle structure wherein tie means is associated with frame members to secure them together and to serve as supports for parts of the suspension system and fenders.

Still another object of the invention is to provide a frame and body structure with which a parallelogram type of independent wheel suspension can be associated in a relation such that the upper links will not be required to take any of the braking torque or the horizonal components of impacts.

Still another object of the invention is to provide a link structure for motor vehicle independent wheel suspension that can be fabricated at low cost and at the same time have sufficient strength to absorb all of the applied loads.

Other objects of the invention will appear from the following description taken in connection with the drawings, which form a part of this specification, and in which:

Fig. 1 is a plan view, partly broken away, of the forward end of a motor vehicle chassis built in accordance with the invention;

Fig. 2 is a front elevational view, partly in section, of the forward end of a motor vehicle chassis incorporating the invention;

Fig. 3 is a side elevational view of the forward end of a combined body and frame of a motor vehicle having the front end of the chassis constructed in accordance with the invention;

Fig. 4 is a sectional view taken on line 4—4 of Fig. 2;

Fig. 5 is a perspective view of one of the tie members.

The invention is shown associated with a motor vehicle in which the body and frame are combined into a unitary structure, the body being represented generally at 10 and having the conventional dash 11 and toe board 12 at the forward end. Extending longitudinally beneath the body are frame side members 13, each consisting of a pair of channel sections 14 and 15 arranged in nested relation forming a box section. These side frame members extend forwardly from the front of the body and the power unit 16, shown diagrammatically, is mounted therebetween. Adjacent the forward end of the side frame members is a cross member consisting of a channel 17 and a base plate 17' secured to close the open side of the channel. The cross member projects under and beyond the frame side members.

The front wheels of the vehicle are indicated at 20 and they are steered in a conventional manner by knuckles 21 that are connected by tie rods 22 to a link 23. This link is actuated by mechanism contained within the steering column 24.

Overlying a portion of the frame side members are compression struts indicated at 30 that are of box form in cross section and each formed of two nested channel sections 31 and 32 suitably secured together. The rear ends of these struts are fixed to the lower portion of the dash by rivets 33 or other suitable fastening means. The rear portions of these struts are inclined upwardly from the side frame members and the forward portions are parallel with portions of the forward ends of the frame side members and rest thereon. Brace members 34 join the angling portion of the struts with the frame side members, and tie members indicated generally at 35 fix the parallel portions of the side frame members and struts together. These tie members serve a plurality of purposes.

Each tie member 35 is preferably formed as a sheet metal stamping and includes a channel shaped portion formed by vertical front and rear walls 36 and 37 joined by a side wall 38. These walls increase in width from the top toward the bottom. Flanges 39 project from the base of walls 36 and 37 and are riveted on the feet of frame member 17. The base portion of each tie member telescopes a projecting end of the cross frame member and the base portion of the front and rear walls are secured to the upstanding legs of the cross member by rivets 40. The extreme ends 41 of the top wall of the cross member 17 are bent down and the base portion of the side wall of the tie members is secured thereagainst by rivets 42.

The central inner edge portions of the walls 36 and 37 of the tie members are bent to form U-brackets 42' that receive the frame side members 13 and the struts 30 where they extend in parallel relation. Rivets 43 are employed to secure these brackets to the top walls of the struts, the bottom walls of the frame side members and the outer side walls of such frame members and struts. It will be seen that the tie members fix the frame cross member with the frame side members and fix the struts with the frame side members.

The tie members also serve as a support for the brackets 44 on which the fenders, as shown at 44', are secured. Bolts 45 secure the fender brackets to walls 38 of the tie members and the bolts extend through backing plates 46 at the inside of the walls. Angular bumper brackets 47, preferably formed as stampings, are secured to the lower portions of the walls 38 of the tie members by rivets 48. Such brackets carry a depending rubber bumper 49 and an upstanding rubber bumper 50.

The wheels 20 are mounted to rotate on spindles 51 that are fixed to channel shaped carriers 52. Connecting the ends of each carrier with the chassis is a pair of substantially parallel link structures. The upper link 53 of each structure is of U-shaped form and has one end 54 mounted on a bushing 55 carried by the upper end of the adjacent carrier. The other end 56 of the upper link is mounted in a rubber bushing 57 mounted in a sleeve 58 extending between the upper ends of walls 36 and 37 of the adjacent tie member. Fixed to the carrier adjacent the upper link by suitable means, such as welding, is a bumper plate 59 arranged to engage with the bumper 50 to limit the downward movement of the wheel.

The lower links of each front suspension consist of a pair of stamped channel members 60 having fixed between outer ends thereof a forging 61 formed with a bearing 62 rotatably mounted upon a pin 63 carried by the lower parallel flanged portions of the adjacent carrier 52. The inner ends of the stampings of the lower links are pivotally mounted upon pins 64 that are secured to the underside of the cross frame member base 17' by bolts 65. Spanning the space between the top of the outer ends of the members 60 of the lower links are bumper plates 66 suitably secured by welding, and these plates are arranged to engage with bumpers 49 to limit the upward movement of the wheels. Extending across the lower face of the members of the lower links are plates 67 that are suitably fixed thereto by welding and each is formed with a depression for seating a coil spring 68. These springs extend upwardly and bear against seats 65' formed in the cross frame member 17. The plates 66 and 67 also serve to stiffen the lower link structure.

Between the lower ends of the wheel carriers 52 and the inner ends of the fender brackets 44 are arranged direct acting shock absorbers 69. The upper section of each shock absorber is mounted upon bearing 70 fixed to the adjacent fender bracket, and the lower section of each shock absorber is pivoted on bearing 63 mounted on the lower end of the adjacent carrier 52.

Most of the parts forming the front end chassis construction herein described are formed of stampings and therefore are light in weight. The lower links are formed of stampings except for the forged end, and the lower members of each link being joined by the spring support and bumper plate results in a rugged light weight structure that is capable of resisting all of the braking torque and the horizontal components of impacts. This arrangement of the lower link requires that the upper links act in tension and compression only, and their sole function is to maintain the wheels in their vertical movements. This results because the upper links are considerably higher from the ground and lower links than the conventional type of upper links, and it is made possible due to the fact that the cross frame member can have sufficient upward flare at the ends to allow such disposition of the links. With previous constructions where the frame was formed as a separate unit, the kick-up necessary to allow the present positioning of the upper links would add to the cost of the frame to a considerable extent. With the use of this front end chassis construction with a combination body and frame, there can be a considerable kick-up where the lower link is attached without entailing any structural difficulty as the frame portion forwardly of the body is usually a separate piece from the floor of the car.

It will be seen that the compression struts extend directly over the forward extensions of the side frame members and engage therewith and are secured thereto directly above the centerline of the spring thus placing the weight loads directly on the springs. The tie members at these points serve to join the struts and frame side members and cross member thus providing a rigid strong structure. The tie members are utilized as supports for the fender brackets and the bumper brackets and they also serve as a mounting for the inner end of the upper suspension links.

The type of upper link employed can be of minimum weight and strength due to the fact that it does not have to take braking torque, as its high location in relation to the road surface and the lower link reduces the stresses and the loads to which it is subjected.

This arrangement and association of members forming the forward end of the chassis structure provides strength with minimum weight and low cost. The structure is especially adapted for use with vehicles in which the frame and body are combined instead of being formed of separate units that are secured together.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a motor vehicle chassis, the combination of a pair of spaced longitudinally extending frame side members, a transversely extending frame member, struts above and having one end parallel with and resting on the frame side members, a tie member engaging each associated strut and side member, and means securing each tie member to the member and strut engaged thereby.

2. In a motor vehicle, the combination of a pair of spaced longitudinally extending frame members, a transversely extending frame member, struts overlying a portion of said frame members and having a portion thereof resting on said frame members, tie members securing said struts and frame members together, two sets of wheel carrying parallel link mechanisms each having one link journaled on the transverse frame member and the other link journaled on a tie member, and a coil spring between the lower link of each set and the transverse frame member, said springs lying directly under the engaging portions of the longitudinal frame members and the struts.

3. In a motor vehicle chassis, a front transversely extending frame member having the end portions in a vertical plane considerably above that of the central portion, a pair of spaced frame members extending longitudinally of the chassis above the front frame member, a pair of struts coextensive with a portion of said longitudinally extending members, and tie members fixing said frame members and struts together.

4. A tie member for structural parts of a motor vehicle chassis comprising a sheet metal stamping having a central, front and rear wall forming a channel structure, a U-flange bent out from the edge of the central portion of the front and rear walls, and flanges bent from the bottom of the front and rear walls.

5. In a chassis construction, the combination of a pair of spaced longitudinally extending frame side members, a pair of struts coextensive with a portion of said side members and having a portion resting thereon, a pair of stamped tie members, said members having a flanged portion partially telescoping the engaged portions of the side members and struts, and means fixing said flanges to the telescoped walls of said side members and struts.

6. In a chassis construction, the combination of a pair of spaced longitudinally extending frame side members, a transversely extending box shaped frame member having the end portions projecting beyond the side frame members, the ends of the transverse member having a downturned flange, and a stamped tie member at each junction of the transverse member with the side members, and means fixing the tie members to the side members, the projecting end portions of the transverse member and the downturned flanges of the transverse member.

7. In a chassis construction, the combination of a pair of spaced longitudinally extending frame side members, a transverse frame member extending under and beyond the side members, stamped tie members at the junction of the transverse member with the side member, said tie members having flanged base portions resting on the projecting ends of the transverse member, and means fixing the tie members to the frame side and transverse members and the flanged base portions to the projecting ends of the transverse member on which they rest.

8. In a chassis construction, a body having a dash, a pair of longitudinal frame members extending forwardly of the body dash, a transverse frame member in advance of the dash having the end portions in a vertical plane appreciably above the central portion, said forwardly extending frame members being curved upwardly and overlying the transverse member, struts coextensive with a portion of the forwardly extending frame members and resting thereon at their forward end, means fixing the forward ends of the struts to the adjacent forwardly extending portions of the frame members and to the transverse member, and means fixing the rear ends of the struts to the body dash.

9. In a motor vehicle frame structure, the combination of spaced longitudinally extending side members, a transversely extending frame member having its ends projecting outside of said side members, and tie members having portions fixed on the projecting ends of the transversely extending member and other portions embracing and fixed to the side members.

10. In a motor vehicle frame, the combination of spaced longitudinally extending side members, a transverse member having its ends projecting beneath and outside of said side members, tie members seated on the projecting ends of said transverse member and embracing said side members, and means fixing said tie members on said transverse member ends and to the embraced portion of said side members.

FRANK C. BEST.